(12) United States Patent
Iwata et al.

(10) Patent No.: US 6,853,376 B2
(45) Date of Patent: Feb. 8, 2005

(54) METHOD OF IMAGE PROCESSING, IMAGE PROCESSING APPARATUS, IMAGE PROCESSING PROGRAM AND RECORDING MEDIUM

(75) Inventors: Midori Iwata, Saitama (JP); Kazuhiko Shibui, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 314 days.

(21) Appl. No.: 10/255,675

(22) Filed: Sep. 27, 2002

(65) Prior Publication Data

US 2003/0071811 A1 Apr. 17, 2003

(30) Foreign Application Priority Data

Sep. 28, 2001 (JP) .................................. 2001-303473

(51) Int. Cl.[7] .............................................. G06T 17/00
(52) U.S. Cl. .................................................. 345/420
(58) Field of Search .............................. 345/420, 421, 345/428, 441, 442, 443, 764, 769, 853, 964; 706/919

(56) References Cited

U.S. PATENT DOCUMENTS

| 4,989,152 A | | 1/1991 | Cheng | |
|---|---|---|---|---|
| 5,856,828 A | * | 1/1999 | Letcher, Jr. | .................. 345/420 |

FOREIGN PATENT DOCUMENTS

JP 08-106553 A 4/1996

OTHER PUBLICATIONS

Farouki, Computer Vision, Graphics, and Image Processing, vol. 33, pp. 209–236 (1986).
Barnhill et al., Computer Aided Geometric Design, vol. 7, pp. 257–280 (1990).
Barnhill et al., Computer Aided Geometric Design, vol. 4, pp. 3–16 (1987).

* cited by examiner

*Primary Examiner*—Almis Jankus
(74) *Attorney, Agent, or Firm*—Birch, Stewart, Kolasch & Birch, LLP (57) ABSTRACT

To enable automatic generation of a cutting curve for a trimming process, for example, even when the line of intersection between two surfaces is a group of lines including a plurality of line segments or curved line segments. A series of processes including a first process to determine whether the line of intersection is a group of lines including a plurality of line segments or curved line segments or a single line segment or curved line segment and a second process to extend at least a line segment or curved line segment out of two adjacent line segments or curved line segments to connect the adjacent line segments or curved line segments with each other when the line of intersection is a group of lines are repeated until the result of the determination in the first process shows that the line of intersection is a single line segment or curved line segment to make the line of intersection into a single line segment or curved line segment.

17 Claims, 9 Drawing Sheets

FIG. 9

METHOD OF IMAGE PROCESSING, IMAGE PROCESSING APPARATUS, IMAGE PROCESSING PROGRAM AND RECORDING MEDIUM

CROSS-REFERENCE TO RELATED APPLICATIONS

The present application claims priority under 35 USC 119 to Japanese Patent Application No. 2001-303473 filed on Sep. 28, 2001 the entire contents thereof is hereby incorporated by reference.

BACKGROUND OF THE INVENTION

1. Field of the Invention

The present invention relates to a method of image processing and an image processing apparatus for generating a desired image by performing a trimming process for at least two different surfaces displayed on the screen of a display unit along the line of intersection of these surfaces, and to a image processing program for implementing these processes on a computer and a recording medium including the image processing program recorded therein.

2. Description of Background Art

A three-dimensional CAD system is used for designing the construction of automotive vehicles and motorcycles and the like.

For example, trimming processes such as combining two objects (materials) and adding a curved surface (fillet) to the combined portion to form a smooth structural shape, or removing a part of an angular portion of an object (material) and adding a curved surface (blend) to the removed portion to produce a natural chamfered surface are performed with a three-dimensional CAD system.

In such a case, for example, in the process of adding a fillet, the trimming process is proceeded for example by the steps of producing a fillet at the intersected portion between two surfaces (including flat surfaces and curved surfaces), subsequently cutting a curved line produced at the end of the fillet as a cutting curve for each surface, selecting a portion to be left as a necessary surface and removing unnecessary portion.

When the cutting curve does not reach the boundary portion (profile line) between the original surfaces, the cutting process cannot be performed on the original surfaces without modification. Therefore, in the related art, the cutting curve extends to the boundary portion between the original surfaces so that it can be cut in a natural shape (for example, see JP-A-8-106553).

However, in handling surface data as a practical matter, for example, even when two difference surfaces appear to be intersecting "in a general way" in broad perspective, there is a case in which they do not intersect "in a general way" when viewed microscopically. The term "in a general way" here means that two surfaces share a single line segment or curved line segment.

The conceivable cases in which two surfaces are not intersected "in a general way" may be the following two cases.

The whole part of the line segment or the curved line segment produced at the end portion of the fillet is not placed correctly on the original surface, and in fact, a line of intersection (a line segment or a curved line segment shared by both surfaces) does not exist.

The whole part of the line segment or the curved line segment produced at the end portion of the fillet is not placed correctly on the original surface, and in fact, it is cut in spots on the original surface and exists in a group of a plurality of line segments or of curved line segments.

In the case of (1) described above, a line of intersection does not exist in fact and thus the portion that is to be a basis for automatically generating a cutting curve does not exist. Therefore, redesigning (regeneration) of the surface on which the fillet is added is preferable.

On the other hand, in the case of (2), though a group of lines including a plurality of line segments or curved line segments may be quoted as a portion that should be a basis for automatically generating a cutting curve, since the method in the related art employs the process of drawing an extension from a line of intersection to the boundary portion on the original surface, it is an essential prerequisite that a single line of intersection is extracted. As a consequent, it cannot be applied to a group of lines including a plurality of line segments or curved line segments, and thus a cutting curve cannot be automatically generated based on the aforementioned group of lines.

Therefore, in the related art, as regards such a group of lines including a plurality of line segments or curved line segments, the operator is obliged to perform work to correct the connect between the line segments, between the curved line segments, or between the line segments and the curved line segments by the use of a coordinate input device such as a mouse or the like. Such correcting work requires a significant time period, and is troublesome because an individual has to make the aforementioned group of lines into a single line of intersection.

SUMMARY AND OBJECTS OF THE INVENTION

With such circumstances in view, it is an object of the present invention to provide a method of image processing, an image processing apparatus, an image processing program and a recording medium in which even when the line of intersection between two surfaces is a group of lines including a plurality of line segments or curved line segments for example, a cutting curve for trimming process can be generated automatically. Thus, the subsequent correcting work is not necessary, so that an improvement in the workability of the three-dimensional CAD system and a reduction in the hours of work can be effectively realized.

A method of image processing according to the present invention is a method of image processing for generating a desired image by performing a trimming process for at least two different surfaces displayed on the screen of a display unit along the line of intersection of these surfaces, wherein the process comprising the steps of determining whether the aforementioned line of intersection is a group of lines including a plurality of line segments, or curved line segments or a single line segment or curved line segment. When the aforementioned line of intersection is a group of lines, performing a process of extending at least a line segment or curved line segment out of adjacent line segments or curved line segments to connect the aforementioned adjacent line segments or curved line segments with each other at least one time to make the aforementioned line of intersection into a single line segment or curved line segment.

More specifically, the present invention is directed to a series of processes comprising a first process to determine whether the aforementioned line of intersection is a group of lines including a plurality of line segments or curved line segments, or a single line segment or curved line segment and a second process to extend at least a line segment or curved line segment out of adjacent line segments or curved line segments to connect the aforementioned adjacent line segments or curved line segments with each other when the aforementioned line of intersection is a group of lines that are repeated until the result of determination in the aforementioned first process shows that the line of intersection is a single line segment or curved line segment to make the aforementioned line of intersection into a single line segment or curved line segment.

Consequently, for example, even when the line of intersection between two surfaces is a group of lines including a plurality of line segments or curved line segments, a cutting curve for trimming process can be generated automatically, and thus the subsequent correcting work is not necessary, so that an improvement in the workability of the three-dimensional CAD system and a reduction in the number of hours of work can be effectively realized.

In a method of image processing according to the present invention, the aforementioned second process may be performed by the steps of measuring the distance between the respective end points of the aforementioned adjacent line segments or curved line segments, and when the measured distance is not more than a prescribed value, extending at least one of the aforementioned adjacent line segments and curved line segments.

The aforementioned prescribed value may be determined based on the logic that it is unreasonable to regard for example that these two surfaces are intersected when the distance between the end points of adjacent line segments or curved line segments exceeds the aforementioned prescribed value, for example, and thus the generated line may lack smoothness even when they are connected.

Determining the aforementioned prescribed value based on such basis allows the adjacent line segments or curved line segments to be connected automatically only when the distance between the respective end points of the adjacent line segment or curved line segment is not more than the prescribed value, and thus combining and trimming of the surfaces can be made reasonably and naturally.

In the aforementioned method of image processing, the direction of extension of the line segment or curved line segment as a target of the aforementioned extension may be the same as the direction of tangent to one of the end points, which is a starting point of extension. The process to connect the aforementioned adjacent line segments or curved line segments with each other may be done by extending the end point of one of the curved line segments towards the end point of the other curved line segment.

Especially when the aforementioned curved line segment is a closed curve, a determination of whether the aforementioned line of intersection is a group of lines including a plurality of line segments, or curved line segments or a single line segment or curved line segment may be made after the aforementioned closed curve is approximated to a line segment or curved line segment having to end points.

Further, an image processing apparatus according to the present invention is an image processing apparatus for generating a desired image by performing a trimming process for at least two different surfaces displayed on the screen of the display unit along the line of intersection of these surfaces, comprising a first functional unit for determining whether the aforementioned line of intersection is a group of lines including a plurality of line segments or curved line segments, or a single line segment or curved line segment, a second functional unit for extending at least a line segment or curved line segment out of adjacent line segments or curved line segments for connecting the aforementioned adjacent line segments or curved line segments with each other when the aforementioned line of intersection is a group of line segments, and a third functional unit for repeating a series of processes including the process in the aforementioned first functional unit and the process in the aforementioned second functional unit until the result of determination in the aforementioned first functional unit shows that it is a single line segment or curved line segment to make the aforementioned line of intersection into a single line segment or curved line segment.

An image processing program according to the present invention is an image processing program being able to be recorded in a memory of the computer system for generating a desired image by being read out and implemented through the CPU of the computer system and performing a trimming process along the line of intersection between at least two different surfaces displayed on the screen of the display unit, comprising a first step of determining whether the aforementioned line of intersection is a group of lines including a plurality of line segments or curved line segments, or a single line segment or curved line segment, and a second step of extending at least a line segment or curved line segment out of adjacent line segments or curved line segments and connecting the aforementioned adjacent line segments or curved line segments with each other when the aforementioned line of intersection is a group of lines, and a third step of repeating a series of processes including the process of the aforementioned first step and the process of the aforementioned second step until the result of the determination in the aforementioned first step shows that it is a single line segment or curved line segment to make the aforementioned line of intersection into a single line segment or curved line segment.

A recording medium according to the present invention is a recording medium in which a program and data to be used in the computer system including a CPU, a memory, and a display unit connected thereto are recorded, wherein the aforementioned program has a capability of generating a desired image by performing a trimming process on the line of intersection between at least two different surfaces displayed on the screen of the aforementioned display unit. A first step is provided of determining whether the aforementioned line of intersection is a group of lines including a plurality of line segments or curved line segments, or a single line segment or curved line segment, and a second step of extending at least a line segment or curved line segment out of adjacent line segments or curved line segments and connecting the aforementioned adjacent line segment or curved line segment with each other when the aforementioned line of intersection is a group of lines, and a third step of repeating a series of processes including the process of the aforementioned first step and the process of the aforementioned second step until the result of determination in the aforementioned first step shows that it is a single line segment or curved line segment to make the aforementioned line of intersection into a single line segment or curved line segment.

In the image processing apparatus, image processing program, and recording medium, as in the case of the method of image processing according to the present invention described above, for example, even when the line of intersection between two surfaces is a group of lines including a plurality of line segments or curved line segments, a cutting curve for a trimming process can be generated automatically. Thus, the subsequent correcting work is not necessary, so that an improvement in the workability of the three-dimensional CAD system and a reduction in the number of hours of work can be effectively realized.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Referring now to FIG. 1 to FIG. 9, an embodiment in which a method of image processing, an image processing apparatus, an image processing program, and a recording medium according to the present invention are applied for example to the three-dimensional CAD system (hereinafter referred simply as a CAD system according to the embodiment) will be described.

Figure 1:
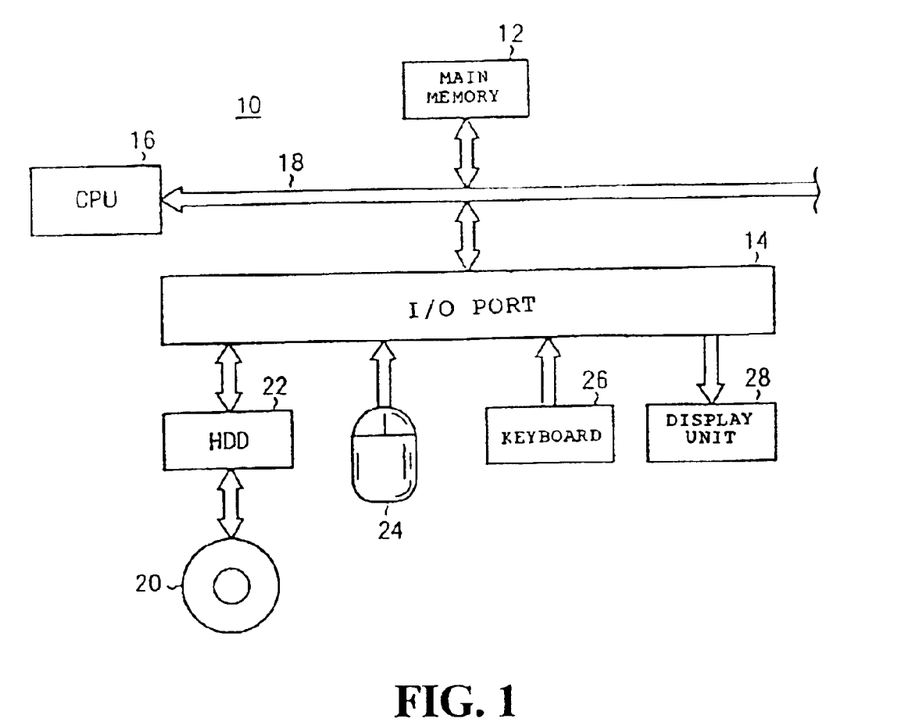
FIG. 1 is a schematic block diagram showing a CAD system according to the present embodiment.

The CAD system 10 according to the present embodiment includes, as shown in FIG. 1, a main memory 12 to be used for actuating a program and transmitting data, an I/O port 14 for interchanging data with the external equipment and a CPU 16 for implementing and processing the program. The main memory 12, the I/O port 14, and the CPU 16 are connected via a system bus 18.

Connected to the I/O port 14 are at least a hard disk drive (HDD) 22 for accessing the hard disk 20 based on the command from the CPU 16, a coordinate input device (for example, a mouse) 24 to be operated by the operator, a keyboard 26 to be used by the operator for input operation, and a display 28 for displaying images generated through the program, images recorded on the hard disk 20, and the like.

An Operating System (OS), application programs and various data are recorded on the aforementioned hard disk 20. In addition to an existing word processing program, a spreadsheet program, and a CAD program, the application programs include an image processing program 100 according to the present embodiment carrying out a method of image processing of the present invention and the like.

Referring now to FIG. 2(A) to FIG. 9, the image processing program 100 (See FIG. 5) according to the present embodiment will be described.

Figure 2A:
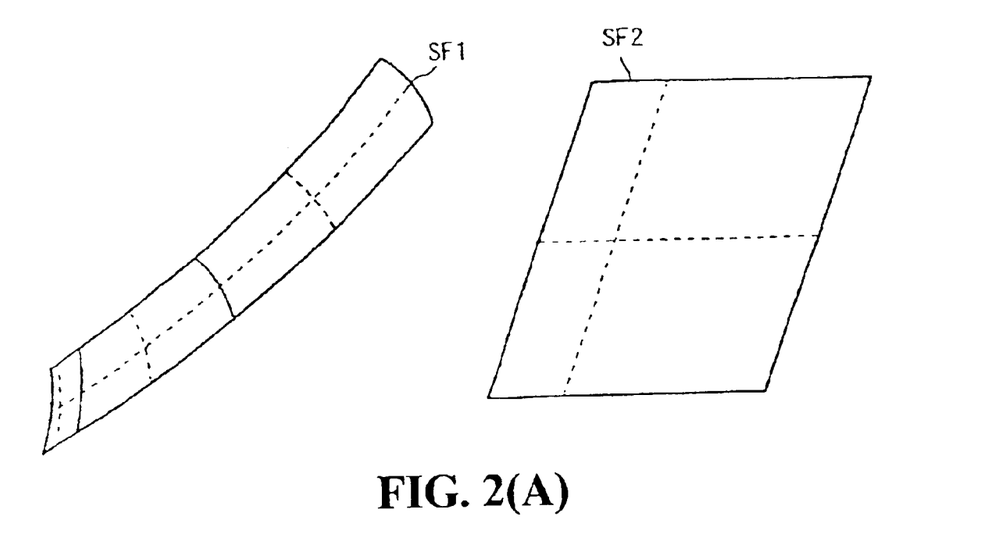
FIG. 2A is an explanatory drawing illustrating an example of two surfaces input or selected by an operator.
Figure 2B:
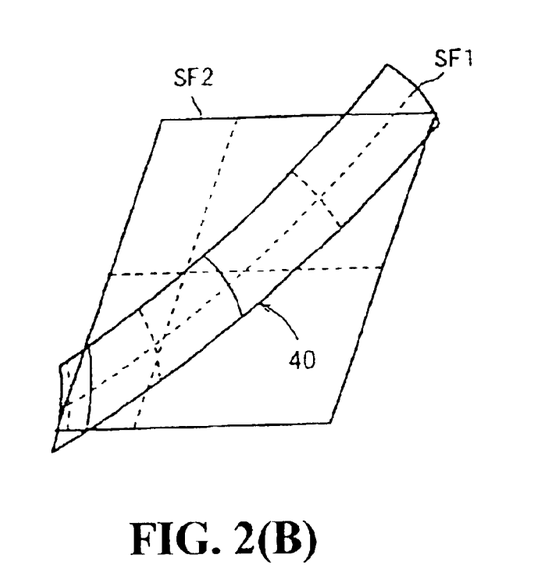
FIG. 2B is an explanatory drawing illustrating a state in which the two surfaces are combined.
Figure 3:
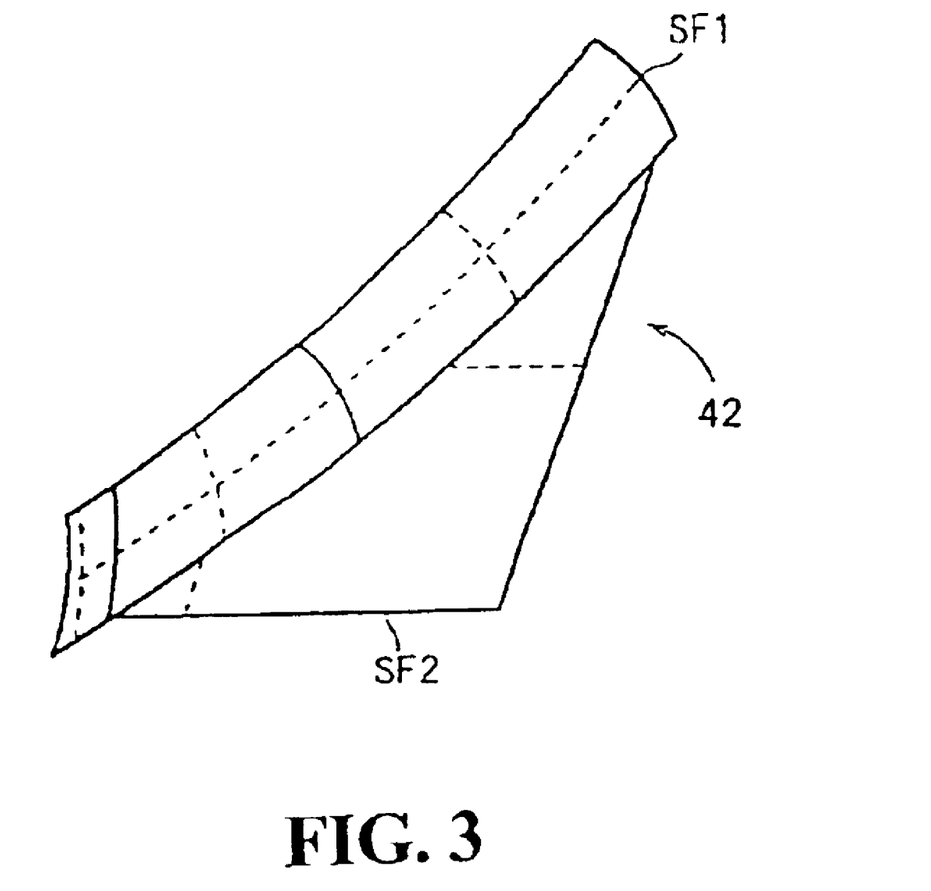
FIG. 3 is an explanatory drawing showing a state in which a desired image is generated by performing a trimming process along the line of intersection between the two surfaces.

The image processing program 100 has a capability of combining at least two different surfaces SF1 and SF2 displayed on the screen of the display unit 28, and performing a trimming process along the line of intersection 40 between these surfaces SF1 and SF2 as shown in FIG. 2A and FIG. 2B for example, and producing a desired image 42 as shown in FIG. 3.

Figure 4:
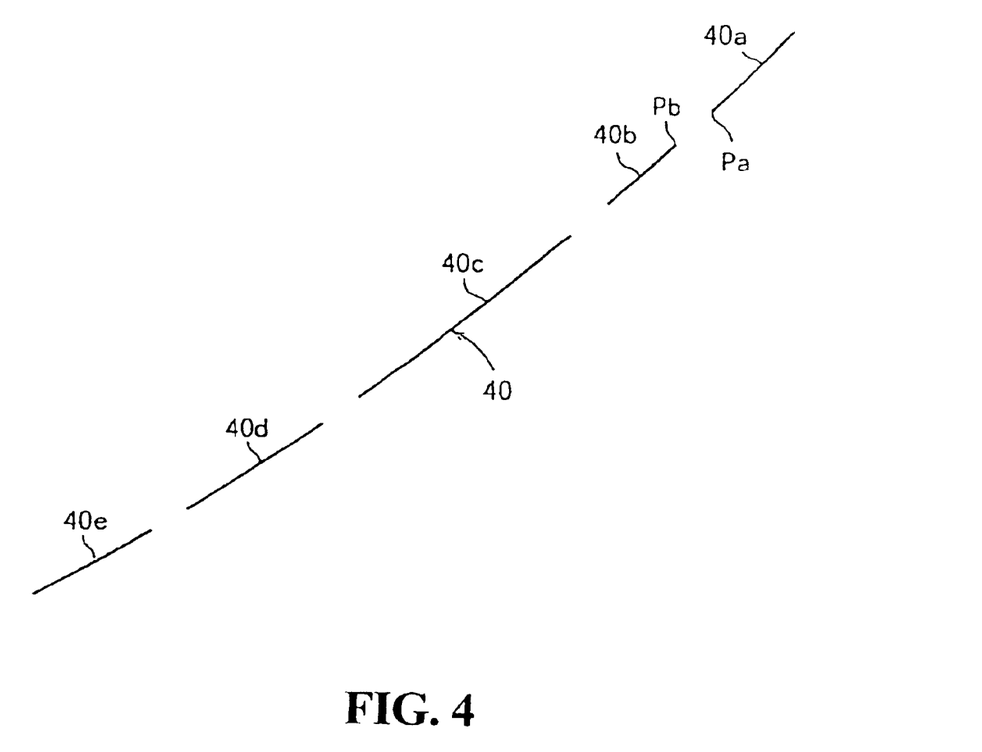
FIG. 4 is an enlarged explanatory drawing illustrating a state in which the line of intersection between two surfaces is cut in spots and constructed of a group of lines including a plurality of line segments or curved line segments.

Generally, when two different surfaces SF1 and SF2 are combined, a single line segment or curved line segment is generated along the line of intersection 40. However, when the line of intersection 40 is viewed microscopically, as shown in FIG. 4, it is cut in spots, and thus there is a case in which it exists in the state of a group of lines including a plurality of line segments or curved line segments 40a to 40e from time to time.

Accordingly, the image processing program 100 has a capability of determining whether the aforementioned line of intersection 40 is a group of lines including a plurality of line segments or curved line segments 40a to 40e, or a single line segment or curved line segment, and when the line of intersection 40 is a group of lines, performing a process of extending at least a line segment or curved line segment (for example 40a) out of adjacent line segments or curved line segments (for example 40a and 40b) and combining the adjacent line segments or curved line segments (for example, 40a and 40b) with each other at least once for making the line of intersection 40 into a single line segment or curved line segment.

Figure 5:
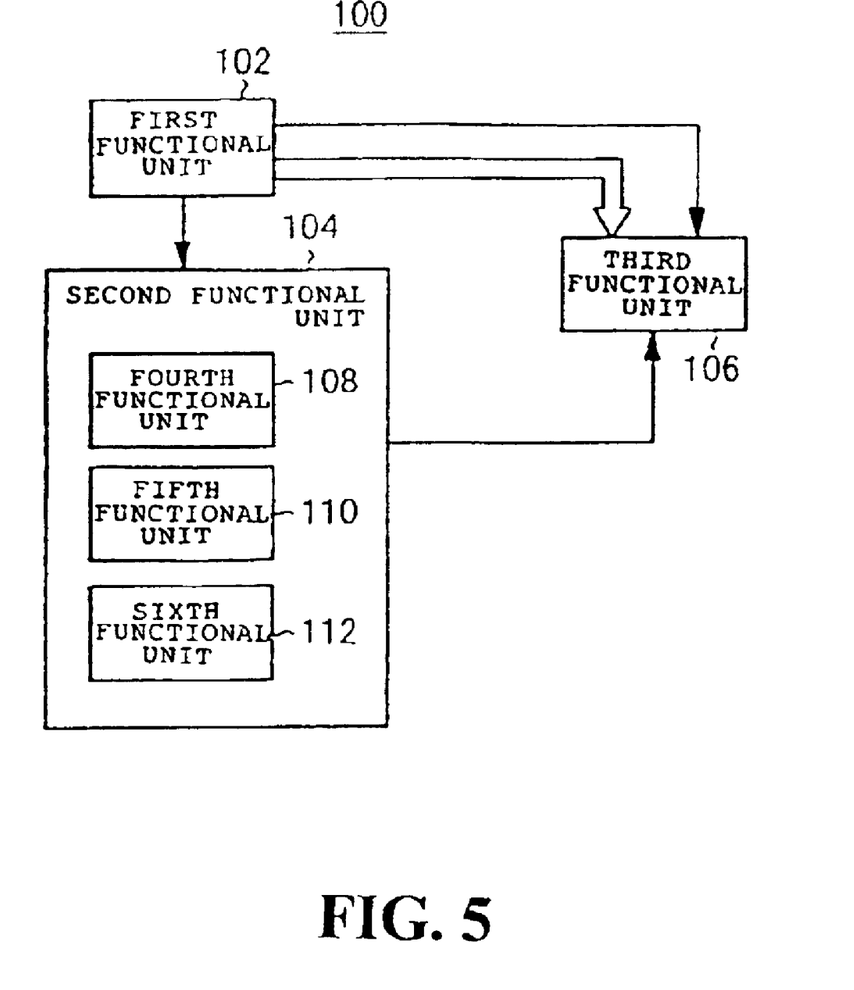
FIG. 5 is a functional block diagram showing a construction of the image processing program according to the present embodiment.

More specifically, the image processing program 100 comprises, as shown in FIG. 5, a first functional unit 102 for determining whether the line of intersection 40 is a group of lines including a plurality of line segments or curved line segments (40a to 40e) or a single line segment or curved line segment. A second functional unit 104 is provided for extending at least one line segment or curved line segment (for example 40a) out of the adjacent line segments or curved line segments (for example 40a and 40b in FIG. 4) and connecting the adjacent line segments or curved line segments (for example 40a and 40b) with each other when the line of intersection 40 is a group of lines. A third functional unit 106 is provided for repeating the process in the first and second functional units 102 and 104 until the result of the determination in the first functional unit 102 shows that it is a single line segment or curved line segment to make the line of intersection 40 into a single line segment or curved line segment.

The second functional unit 104 includes a fourth functional unit 108 for measuring the distance between the end points (for example, Pa and Pb) of the adjacent line segments or curved line segments (for example, see 40a and 40b in FIG. 4) and determining whether or not the distance is not more than the prescribed value, and a fifth functional unit 110 for extending at least one of the aforementioned adjacent line segments or curved line segments when the measured distance is not more than the prescribed value.

Figure 6:
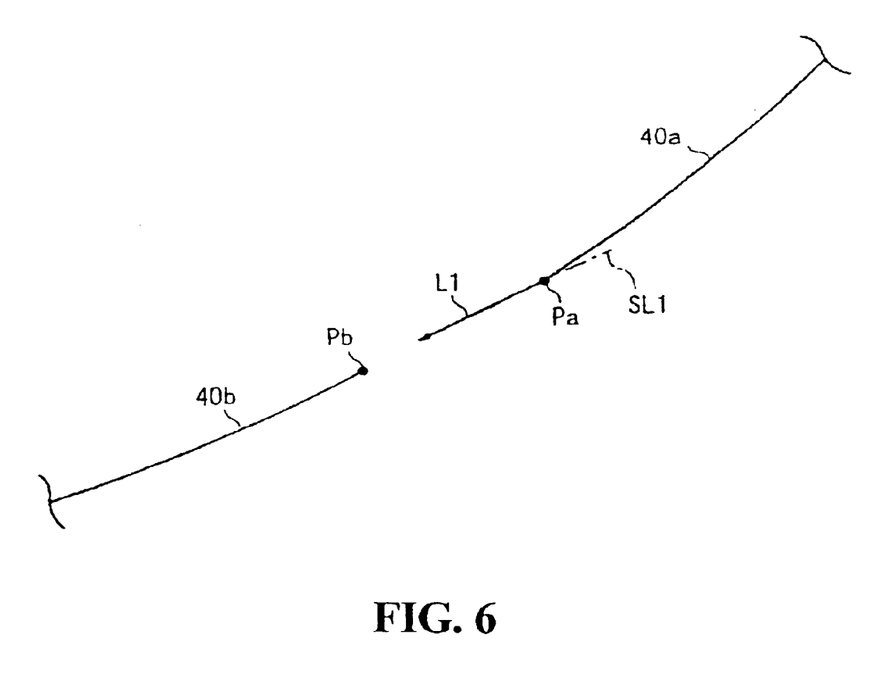
FIG. 6 is an explanatory drawing illustrating an example of techniques of extending one of the curved line segment from the end point thereof in the direction of tangent.

There are two technique of extending one of line segments or curved line segments, which includes a first technique as shown in FIG. 6 for example to determine the direction of extension of the line segment or curved line segment as a target of extension (for example, 40a) in the same direction as the tangent SL1 to an end point Pa, which is a starting point of extension. A second technique is provided to extend one of the line segments or curved line segments (for example, 40a) from the end point Pa towards the end point Pb of the other line segment or curved line segment (for example, 40b).

It is preferable to determine the prescribed value in the designing stage based on the following logic. That is, it may be determined on the basis of such logic that, it is unreasonable to regard that these two surfaces are intersected when the distance between the respective end points of the adjacent line segments or curved line segments 40a to 40e exceeds the aforementioned prescribed value, for example, and thus the generated line may lack smoothness even when they are connected. In such a case, the fact may be informed to the operator by providing an error display to promote the operator to reconsider about the design regarding the combining of two surfaces SF1 and SF2.

Figure 7A:
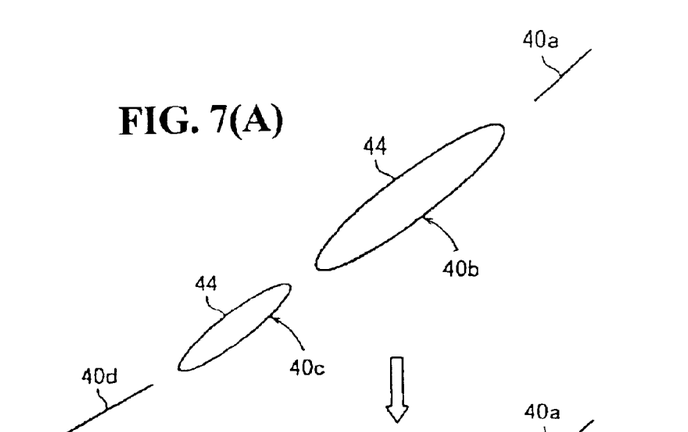
FIG. 7A is an explanatory drawing illustrating a state in which the line of intersection includes a closed curve.

When the line of intersection 40 includes a plurality of curved line segments, as shown in FIG. 7A for example, there is a case in which at least one of them is closed (closed curve) 44. Since no end point exists on the closed curve 44, it is impossible to measure the distance between the end points simply in the fourth functional unit 108. Therefore, the second functional unit 104 is provided with a sixth functional unit 112 for approximating the aforementioned closed curve 44 into a line segment or curved line segment having two end points. The sixth functional unit 112 performs the process including approximating the closed curve 44 for example into a rectangular or oblong, and taking the midpoints of the respective shorter sides or of shorter axis as end points when the length of each shorter side or each shorter axis is not more than the prescribed length.

The prescribed length is preferably determined in the designing stage on the basis of the following logic. That is, the smallest width (threshold value) that the closed curve 44 can be regarded as one of the line segments or curved line segments along the line of intersection 40 is determined as a prescribed value on the basis of such logic that it is not reasonable to regard the closed curve 44 of which the shorter side or the shorter axis exceeds the prescribed value as a line segment or curved line segment that constitutes the line of intersection 40, and thus it is established as a separate line (a line constitutes a different image, being distinct from the line of intersection 40, and the like). In this case as well, it is preferable to provide a error display when the length of the shorter side or shorter axis exceeds the prescribed value.

Figure 8:
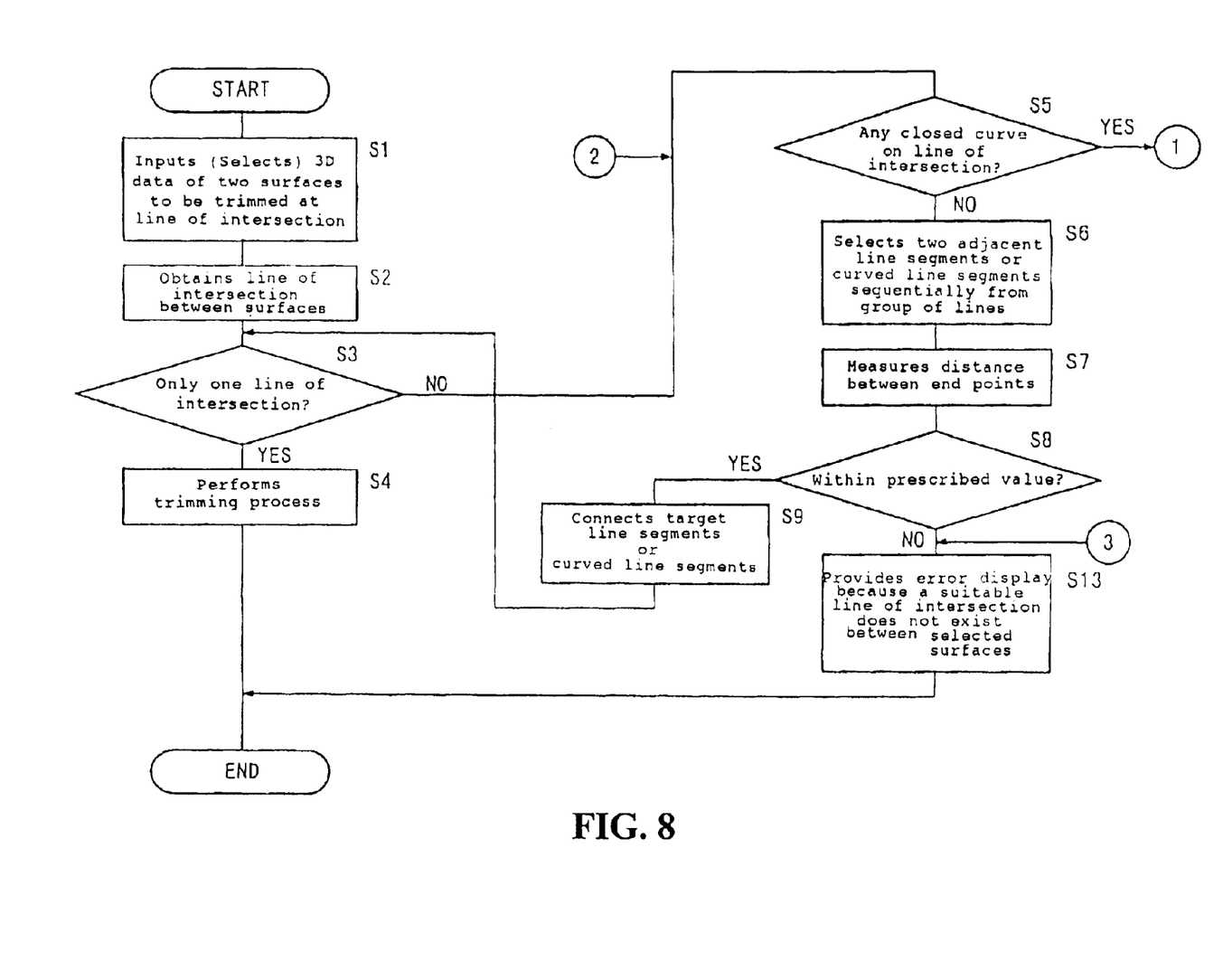
FIG. 8 is a flow chart (No.1) showing a processing operation of the image processing program according to the present embodiment.
Figure 9:
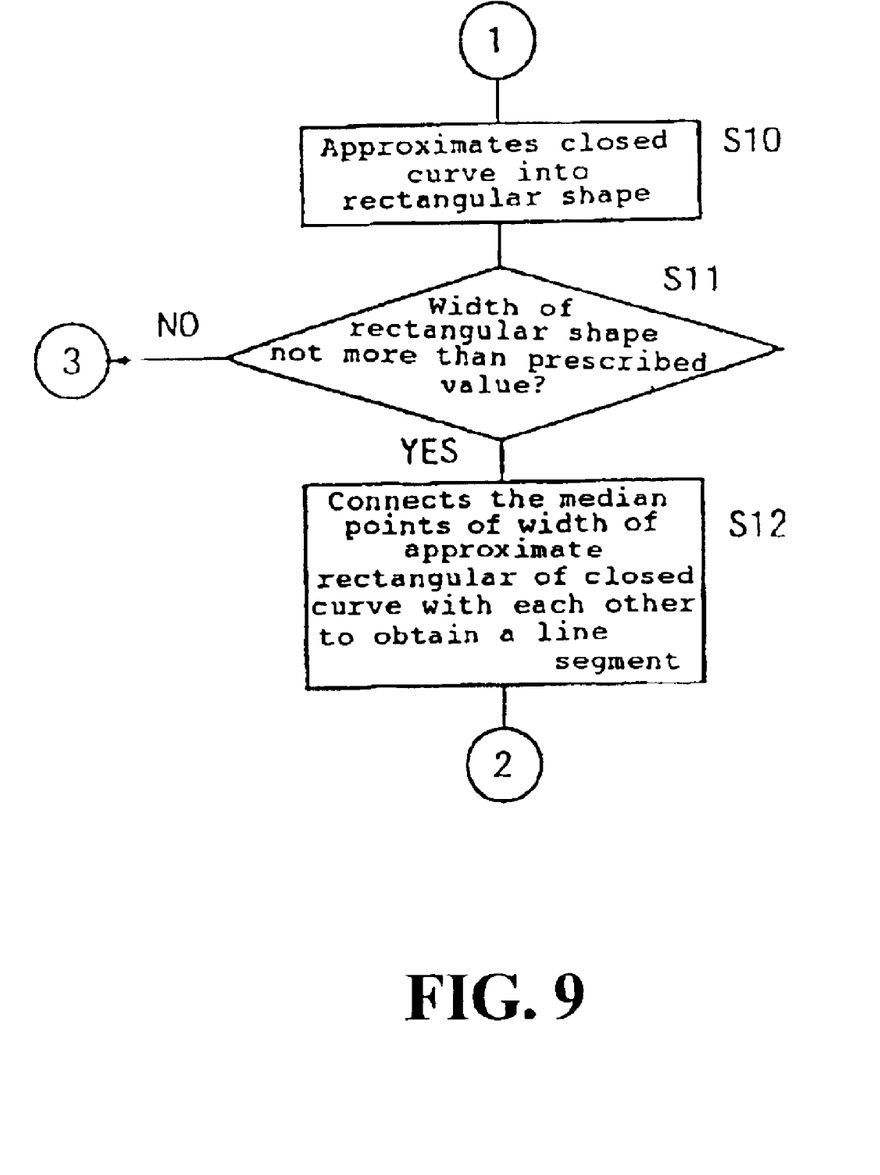
FIG. 9 is a flow chart (No.2) showing a processing operation of the image processing program according to the present embodiment.

Referring now to FIG. 8 and FIG. 9, the processing operation of the image processing program 100 according to the present embodiment will be described.

In the step S1 in FIG. 8, for example, three dimensional CAD data regarding two surfaces SF1 and SF2 to be trimmed along the line of intersection 40 is input or selected.

Subsequently, in the step S2, the line of intersection 40 between the two surfaces SF1 and SF2 is obtained. This computation may be implemented by the image processing program 100 and, for example, the CAD program which is executed in a multi-tasking operation.

Then, in the step S3, whether or not the line of intersection 40 obtained in the aforementioned step S2 is constructed of a single line segment or a single curved line segment is determined. When the line of intersection 40 is constructed of a single line segment or a single curved line segment, the procedure goes to the step S5, and whether or not at least one line that is closed (closed curve) 44 exists along the line of intersection 40 is determined. When there is no closed curve 44 along the line of intersection 40, the procedure goes to the next step S6, and two adjacent line segments or curved line segments (for example, 40a and 40b in FIG. 4) along the line of intersection 40 are selected. In other words, image data of the two line segments or curved line segments (40a and 40b) is extracted.

Subsequently, in the step S7, the distance between two endpoints Pa and Pb of the two line segments or curved line segments (40a and 40b), being adjacent with respect to each other, is measured. Then, in the step S8, whether or not the aforementioned distance is not more than the prescribed value is determined.

When the aforementioned distance is not more than the prescribed value, the procedure goes to the step S9, and as shown in FIG. 6 for example, the line L1 extends from the end point Pa of one (for example, 40a) of two selected line segments or curved line segments (40a and 40b) in the direction of a tangent SL1 to the end point Pa, and is connected to the other line segment or curved line segment (40b). As a matter of course, the end point Pa of one line segment or curved line segments (40a) and the end point Pb of the other line segment or curved line segment (40b) may be connected by a straight line.

When the processing in the aforementioned step S9 is finished, the procedure goes back to the aforementioned step S3, and whether or not the line of intersection 40 is constructed of a single line segment or a single curved line segment is determined again. When it is constructed of a single line segment or a single curved line segment, the procedure goes to the step S4, and when it is still constructed of a plurality of line segments or curved line segments, the procedure goes to the step S5.

Figure 7B:
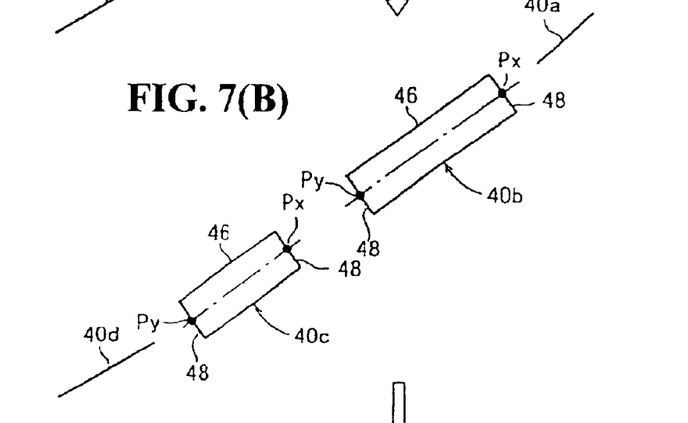
FIG. 7B is an explanatory drawing showing a state in which the closed curve is approximated into a rectangular.

When it is determined that a closed curve 44 (see FIG. 7A) exists along the line of intersection 40 in the aforementioned step S5, the procedure goes to the step S10 shown in FIG. 9, and as shown in FIG. 7B, the closed curve 44 is approximated for example to a rectangular 46. In this approximating process, it may be approximated to an oblong in addition to the rectangular 46.

Figure 7C:
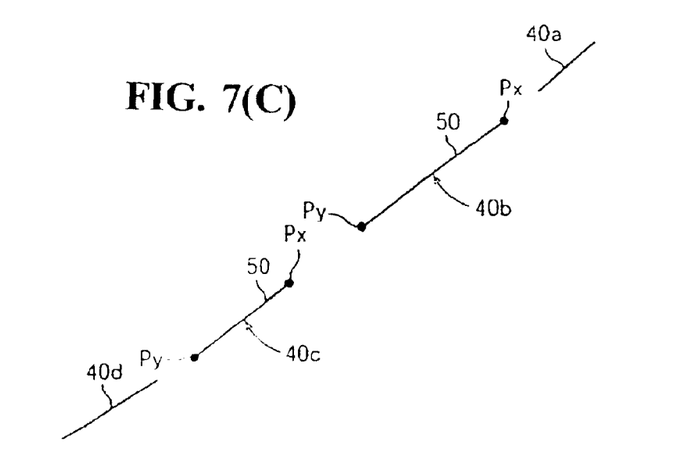
FIG. 7C is an explanatory drawing illustrating a state in which the rectangular is substituted by a line segment.

Then, in the step S11, whether or not the width of the rectangular 46 (length of the shorter side 48) is not more than the prescribed value is determined. When it is approximated to an oblong, whether or not the shorter axis of the oblong is not more than the prescribed value is determined. When it is not more than the prescribed value, the procedure goes to the next step S12, in which the midpoints Px and Py of the two shorter sides 48 of the approximated rectangular 46 are obtained, and then as shown in FIG. 7C, these midpoints Px and Py are connected with each other and the aforementioned rectangular 46 is substituted by a line segment 50.

Subsequently, the procedure goes back to the aforementioned step S5, and whether or not the closed curve 44 exists along the line of intersection 40 is determined again. Repeating the procedures of the step S5→the step S10→the step S11→the step S12→the step S5 substitutes all the closed curves 44 (closed curve of which the width after approximation into the rectangular 46, an oblong, or the like is not more than the prescribed value) that exist along the line of intersection 40 into line segments 50 having two end points Px and Py.

On the other hands, when the distance between the end points of the two line segments or curved line segments being close with each other is determined to be in excess of the prescribed value in the step S8 in FIG. 8, or when the length of the shorter side 48 of the approximated rectangular 46 is determined to be in excess of the prescribed value in the aforementioned step S11, the procedure goes to the step S13, and an error display indicating that a suitable line of intersection 40 does not exist between the selected two surfaces SF1 and SF2 is provided.

In this way, repeating the aforementioned procedures of the step S3→the step S5→the step S8→the step S3 substitutes the line of intersection 40 into a single line segment or curved line segment. Subsequently, the aforementioned line of intersection 40 is subjected to the trimming process as a cutting curve segment in the step S4. When the trimming process in the step S4 is finished, the process in this image processing program 100 terminates.

In this embodiment, in a case where a desired image 42 is generated by performing the trimming process along the line of intersection 40, for example, between two different surfaces SF1 and SF2, a series of processes including the process of determining whether the aforementioned line of intersection 40 is a group of lines including a plurality of line segments or curved line segments, or a single line segment or curved line segment, and the process of extending at least one of the adjacent line segments or curved line segments to connect the aforementioned adjacent line segments or curved line segments with each other when the line of intersection 40 is a group of lines is repeated until the aforementioned result of the determination shows that it is a single line segment or curved line segment to make the aforementioned line of intersection 40 into a single line segment or curved line segment. Therefore, even when the line of intersection 40, for example, between the two surfaces SF1 and SF2 is a group of lines including a plurality of line segments or curved line segments, a cutting curve for a trimming process can be generated automatically, and thus the subsequent correcting work is not necessary, so that an improvement in the workability of the three-dimensional CAD system and a reduction in the number of hours of work can be effectively realized.

Especially in the present embodiment, the distance of the end points of the adjacent line segments or curved line segments is measured, and at least one of the aforementioned adjacent line segments or curved line segments extends when the measured distance is not more than the prescribed value, and the aforementioned prescribed value is determined based on the logic that when the distance between the end points of the adjacent line segments or curved line segments, for example, is in excess of the aforementioned prescribed value, for example, it is unreasonable to regard these two surfaces as intersecting. Thus, the generated line may lack smoothness even when they are connected. Therefore, the adjacent line segments or curved line segments are connected automatically only when the distance between the end points of the adjacent line segments or curved line segments are not more than the prescribed value. Thus, combining and trimming of the surface can be made reasonably and naturally.

In addition, when the aforementioned curved line segment is a closed curve 44, whether the line of intersection 40 is a group of lines including a plurality of line segments or curved line segments, or a single line segment or curved line segment is determined after the closed curve 44 is approximated to a line segment 50 or curved line segment having two end points Px and Py. Therefore, even when the closed curve 44 exists along the line of intersection 40, the line of intersection is automatically generated and is subjected to a trimming process as far as it can be recognized as a line of intersection. Consequently, the closed curve 44 that has not been recognized as a target of the line of intersection so far can be taken as a target of the line of intersection. Thus, a labor of reconsideration of design regarding to the trimming process of the surfaces can be avoided as much as possible.

The method of image processing, the image processing apparatus, the image processing program, and the recording medium according to the present invention are not limited to the above-described embodiment. It is possible to employ various constructions without departing from the scope of the present invention as a matter of course.

As is described thus far, with the method of image processing, the image processing apparatus, the image processing program and the recording medium according to the present invention, for example, even when the line of intersection between two surfaces is a group of lines including a plurality of line segments or curved line segments, a cutting curve for a trimming process can be generated automatically. Thus, the subsequent correcting work is not necessary, so that an improvement in the workability of the three-dimensional CAD system and a reduction in the number of hours of work can be effectively realized.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method of image processing for generating a desired image by performing a trimming process for at least two different surfaces displayed on the screen of a display unit along the line of intersection of these surfaces comprising the following steps:

determining whether said line of intersection is a group of lines including a plurality of line segments or curved line segments, or a single line segment or curved line segment; and performing a process of extending at least a line segment or curved line segment out of adjacent line segments or curved line segments and connecting said adjacent line segments or curved line segments with each other at least one time to make said line of intersection into a single line segment or curved line segment when said line of intersection is a group of lines.

2. The method of image processing according to claim 1, wherein a series of processes comprising a first process of determining whether said line of intersection is a group of lines including a plurality of line segments or curved line segments, or a single line segment or curved line segment and a second process for extending at least a line segment or curved line segment out of adjacent line segments or curved line segments to connect said adjacent line segments or curved line segments with each other when said line of intersection is a group of lines repeated until the result of the determining in said first process shows that said line of intersection is a single line segment or curved line segment to make said line of intersection into a single line segment or curved line segment.

3. The method of image processing according to claim 2, wherein said second process may be performed by the steps of:
   measuring the distance between the respective end points of said adjacent line segments or curved line segments; and
   extending at least one of said adjacent line segments and curved line segments when the measured distance is not more than a prescribed value.

4. The method of image processing according to claim 1, wherein the direction of extension of the line segment or curved line segment as a target of said extension may be the same as the direction of tangent to one of the end points, which is a starting point of extension.

5. The method of image processing according to claim 2, wherein the direction of extension of the line segment or curved line segment as a target of said extension may be the same as the direction of tangent to one of the end points, which is a starting point of extension.

6. The method of image processing according to claim 3, wherein the direction of extension of the line segment or curved line segment as a target of said extension may be the same as the direction of tangent to one of the end points, which is a starting point of extension.

7. The method of image processing according to claim 1, wherein the process to connecting said adjacent line segments or curved line segments with each other may be done by extending the end point of one of the curved line segments towards the end point of the other curved line segment.

8. The method of image processing according to claim 2, wherein the process to connecting said adjacent line segments or curved line segments with each other may be done by extending the end point of one of the curved line segments towards the end point of the other curved line segment.

9. The method of image processing according to claim 3, wherein the process to connecting said adjacent line segments or curved line segments with each other may be done by extending the end point of one of the curved line segments towards the end point of the other curved line segment.

10. The method of image processing according to claim 1, wherein when said curved line segment is a closed curve, determination of whether said line of intersection is a group of lines including a plurality of line segments or curved line segments, or a single line segment or curved line segment may be made after said closed curve is approximated to a line segment or curved line segment having two end points.

11. The method of image processing according to claim 2, wherein when said curved line segment is a closed curve, determination of whether said line of intersection is a group of lines including a plurality of line segments or curved line segments, or a single line segment or curved line segment may be made after said closed curve is approximated to a line segment or curved line segment having two end points.

12. The method of image processing according to claim 3, wherein when said curved line segment is a closed curve, determination of whether said line of intersection is a group of lines including a plurality of line segments or curved line segments, or a single line segment or curved line segment may be made after said closed curve is approximated to a line segment or curved line segment having two end points.

13. The method of image processing according to claim 4, wherein when said curved line segment is a closed curve, determination of whether said line of intersection is a group of lines including a plurality of line segments or curved line segments, or a single line segment or curved line segment may be made after said closed curve is approximated to a line segment or curved line segment having two end points.

14. The method of image processing according to claim 7, wherein when said curved line segment is a closed curve, determination of whether said line of intersection is a group of lines including a plurality of line segments or curved line segments, or a single line segment or curved line segment may be made after said closed curve is approximated to a line segment or curved line segment having two end points.

15. An image processing apparatus for generating a desired image by performing a trimming process for at least two different surfaces displayed on the screen of the display unit along the line of intersection of the surfaces comprising:
   a first functional unit for determining whether said line of intersection is a group of lines including a plurality of line segments or curved line segments, or a single line segment or curved line segment;
   a second functional unit for extending at least a line segment or curved line segment out of adjacent line segments or curved line segments for connecting said adjacent line segments or curved line segments with each other when said line of intersection is a group of lines; and
   a third functional unit for repeating a series of processes including the process in said first functional unit and the process in said second functional unit until the result of determination in said first functional unit shows that it is a single line segment or curved line segment to make said line of intersection into a single line segment or curved line segment.

16. An image processing program being able to be recorded in a memory of the computer system for generating a desired image by being read out and implemented through the CPU of the computer system and performing a trimming process for at least two different surfaces displayed on the screen of a display unit along the line of intersection between the surfaces comprising the following steps:
   a first step of determining whether said line of intersection is a group of lines including a plurality of line segments or curved line segments, or a single line segment or curved line segment;
   a second step of extending at least a line segment or curved line segment out of adjacent line segments or curved line segments and connecting said adjacent line segment or curved line segment with each other when said line of intersection is a group of lines; and
   a third step of repeating a series of processes including the process of said first step and the process of said second step until the result of determining in said first step shows that it is a single line segment or curved line segment to make said line of intersection into a single line segment or curved line segment.

17. A recording medium in which a program and data to be used in the computer system including a CPU, a memory, and a display unit connected thereto are recorded, characterized in that said program has a capability of generating a desired image by performing a trimming process along the line of intersection between at least two different surfaces displayed on the screen of said display unit, and comprises the following steps:

- a first step of determining whether said line of intersection is a group of lines including a plurality of line segments or curved line segments, or a single line segment or curved line segment;
- a second step of extending at least a line segment or curved line segment out of adjacent line segments or curved line segments and connecting said adjacent line segment or curved line segment with each other when said line of intersection is a group of lines; and
- a third step of repeating a series of processes including the process of said first step and the process of said second step until the result of determining in said first step shows that it is a single line segment or curved line segment to make said line of intersection into a single line segment or curved line segment.

* * * * *